UNITED STATES PATENT OFFICE.

CHARLES C. MOORE, OF NEW YORK, N. Y.

IMPROVEMENT IN CHEWING-GUM CANDIES.

Specification forming part of Letters Patent No. 146,541, dated January 20, 1874; application filed January 5, 1874.

*To all whom it may concern:*

Be it known that I, CHARLES C. MOORE, of 96 Liberty street, New York city, State of New York, have invented a new and useful Improvement in Chewing-Gum Candy; and I hereby declare the following to be such a full description of the same as will enable others skilled in the art to which it appertains to manufacture the same.

I am aware that it is no new thing to make chewing-gum, there being many pleasing and healthful chewing-gums manufactured and in the market; and, too, I am equally aware that it is no new or novel thing to make rich and enjoyable candy; but the combining of the two articles is new in the arts.

My invention consists in combining chewing gum or gums with candy or candies in such a manner that when a delicious piece of candy is eaten the result is a delightful chewing-gum remains in the mouth, retaining largely and for a considerable time the agreeable aroma and flavoring that is so pleasing in the candy, thereby giving the chewing-gum an enjoyable quality that can in no other manner be imparted.

I prepare, first, a suitable chewing-gum from any of the various ingredients that chewing-gums are made from, and, after forming it into suitable-sized pieces of convenient shape, I proceed to embed it into candy by first dipping the pieces of chewing-gum into melted and suitably-flavored sugar, then dropping the pieces of gum into pulverized sugar, repeating the operation a sufficient number of times to render the article suitable to go into the pan commonly used in the manufacture of pan-work candy. I then proceed to coat the pieces of gum, the same as is usually done in preparing almonds, cloves, cassia-buds, and other sugar-plums.

In another process I form the chewing-gum into a roll of convenient size and length; then, my candy suitably flavored and prepared to make into sticks of candy, I roll about the chewing-gum the warm flexible candy, which warms the gum; when both are pulled out together to a convenient size, cooled, then broken in pieces of suitable length, revealing the chewing-gum in the center of the stick of candy.

In another process I form the chewing-gum into sheets of suitable thickness, cut the gum in the form of lozenges or other acceptable shape, then, preparing my candy in the same form or shape and of acceptable thickness, I place one layer of chewing-gum between two layers or thicknesses of candy, while both are warm, the gum acting as a cement holding the three pieces as one.

In the matter of the process of incorporating chewing-gum within candy, I do not limit myself to any one prescribed method. Any plan that experience may teach as an improvement on the above may be adopted.

I claim as a new article of manufacture—

A confection consisting of molasses or sugar candy and chewing-gum combined, substantially and for the purposes herein set forth.

CHARLES C. MOORE.

Witnesses:
SAMUEL WILGUS,
RICHARD L. FABLER.